US011865549B2

(12) United States Patent
Miles et al.

(10) Patent No.: US 11,865,549 B2
(45) Date of Patent: Jan. 9, 2024

(54) METHOD AND APPARATUS FOR RECOVERY OF MAGNETITE AND MAGNETITE BEARING ELEMENTS FROM A SLURRY

(71) Applicant: DRP Ventures Inc., Kelowna (CA)

(72) Inventors: David Roger Miles, Kelowna (CA); Peter Thomas Watson, West Kelowna (CA)

( * ) Notice: Subject to any disclaimer, the term of this patent is extended or adjusted under 35 U.S.C. 154(b) by 0 days.

(21) Appl. No.: 16/932,816

(22) Filed: Jul. 19, 2020

(65) Prior Publication Data

US 2021/0016293 A1 Jan. 21, 2021

Related U.S. Application Data

(60) Provisional application No. 62/876,442, filed on Jul. 19, 2019.

(30) Foreign Application Priority Data

Jul. 19, 2019 (CA) ................................ CA 3050235

(51) Int. Cl.
*B03C 1/12* (2006.01)
*B03C 1/26* (2006.01)
*B03C 1/033* (2006.01)

(52) U.S. Cl.
CPC .................. *B03C 1/12* (2013.01); *B03C 1/26* (2013.01); *B03C 2201/20* (2013.01); *B03C 2201/22* (2013.01)

(58) Field of Classification Search
CPC .... B03C 1/12; B03C 1/26; B03C 1/10; B03C 1/033; B03C 1/0332; B03C 2201/18; B03C 2201/20; B03C 2201/22
USPC ........................................ 209/213, 224, 288
See application file for complete search history.

(56) References Cited

U.S. PATENT DOCUMENTS 3,146,191 A 8/1964 Greenwald
3,168,464 A 2/1965 Ferris et al.
3,856,666 A * 12/1974 Yashima .................. B03C 1/03 209/219
3,969,226 A 7/1976 Moelders
4,046,680 A * 9/1977 Fritz ......................... B03C 1/03 209/225

(Continued)

FOREIGN PATENT DOCUMENTS

EP 0847937 A1 * 6/1998 ............. A47B 77/18
GB 2551828 A * 1/2018 ............. B03C 1/288

OTHER PUBLICATIONS

Westermann, KG, “Refuse Receptacle, Movable on Rails, Able to be Housed into a Piece of Furniture” (English Translation), Jun. 17, 1998, worldwide.espacenet.com (Year: 1998).*

(Continued)

*Primary Examiner* — Michael McCullough
*Assistant Examiner* — Molly K Devine
(74) *Attorney, Agent, or Firm* — Richard D. Okimaw

(57) ABSTRACT

A ferro-magnetic material recovery system includes a drum rotating within a magnet housing. An array of magnets mounted within the magnet housing have corresponding magnetic fields which decrease in strength in the direction of rotation of the drum to extract the material from a slurry flowing through the drum. Flow deflectors may be mounted in the drum. The array of magnets may form a magnetic core having magnetic fields that are radially aligned.

20 Claims, 14 Drawing Sheets

(56) References Cited

U.S. PATENT DOCUMENTS

| | | | | |
|---|---|---|---|---|
| 4,051,023 | A | 9/1977 | Fogle et al. | |
| 4,784,759 | A * | 11/1988 | Elliott | B03C 1/14 209/223.1 |
| 5,975,310 | A | 11/1999 | Darling et al. | |
| 6,149,014 | A | 11/2000 | Mankosa et al. | |
| 7,743,926 | B2 * | 6/2010 | Lewis-Gray | B03C 1/145 209/223.2 |
| 8,196,751 | B2 | 6/2012 | Shuttleworth et al. | |

OTHER PUBLICATIONS

Cuerrier, Pierre, PCT International Search Report of PCT/CA2020/05999, dated Oct. 9, 2020, 3 pages, ISA/CA, Gatineau, Quebec, Canada.

Lozovaya, S. Y. et al., Theoretical validation for changing magnetic fields of systems of permanent magnets of drum separators, IOP Conf. Series: Materials Science and Engineering, Mar. 2018, pp. 1-8, Issue 327, IOP Publishing.

* cited by examiner

SECTION VIEW
(ALONG LINE 9-9 )

MAGNET OPEN, MAGNETITE
HOPPER RETRACTED FROM DRUM

SECTION VIEW
(ALONG LINE 12-12)

METHOD AND APPARATUS FOR RECOVERY OF MAGNETITE AND MAGNETITE BEARING ELEMENTS FROM A SLURRY

FIELD OF THE INVENTION

This invention relates to the field of using magnets to remove ferro-magnetic material from a flow or slurry, for example the recovery of magnetite.

BACKGROUND

As one example of the ferro-magnetic materials this specification is directed to, magnetite is a highly magnetic gray-black mineral which consists of an oxide of iron and is an important form of iron ore. This naturally occurring rock mineral is mined and procured by many industrial mineral processors and utilized in the processing of certain products such as coal, potash, iron, diamonds, etc.; this is often referred to as heavy media separation. Magnetite is also one of the four main types of iron ore which iron is produced from. Magnetite may also be contained in so-called para-magnetics; for example, when combined in rock having non-ferrous elements such as quartz. As used herein the word magnetite is intended to include both pure magnetite and para-magnetics which include magnetite.

Magnetite is extracted from slurries in processing circuits, including the iron ore industry by the means of a permanent magnetic drum separation systems. These separators consist of a magnet array affixed to an axle. This axle/magnet arc assembly (~120 degrees) is housed within a non-ferrous drum, such as stainless steel, having sealed endplates. The drum assembly is mounted in a tank. The tank consists of an inlet, non-ferrous outlet and ferrous discharge point. The stationary magnetic arc within the enclosed stainless steel drum is positioned typically at the bottom of the drum assembly so as the slurry will pass into and through the magnetic field. The clearance between the tank and the drum is relatively narrow, for example within the range of ¾ inch to two inches clearance, to ensure the slurry is exposed to the magnetic field for magnetite extraction. Once the magnetic material is captured, the rotating drum conveys the retained magnetite up and around to the magnetite discharge point.

This extraction method offers a number of challenges to the processing facility in that oversize product (larger debris) will get past broken or deteriorated screens, and get pinched or trapped in the small clearance between the drum and tank. This can lead to dents that damage and break apart the brittle internal magnet core. The broken internal magnetic core is rendered ineffective and allows magnetite to pass through the system, discharging into the non-ferrous outlet creating losses. The lost magnetite has to be replaced with new magnetite adding to operating costs of the processing facility.

Trapped over-sized solids can also abrade the shell leading to holes in the drum allowing magnetite and slurry to fill the drum. The seals on the endplate are subject to wear and failure, allowing the drum to fill up with slurry. Once the drum fills up with the slurry the drum becomes extremely heavy creating handling and safety issues. Most facilities' crane capacities are unable to handle the extra weight in removing the flooded drum for repair.

It is thus desirable to recover ferro-magnetic material such as magnetite from a slurry containing solids while avoiding or mitigating the effect of the problems in the prior art.

In the prior art, Applicant is aware of U.S. Pat. No. 5,975,310, entitled Method and Apparatus for Ball Separation, which issued to Darling et al on Nov. 2, 1999. In that specification, incorporated herein in its entirety, the problem of ball wear, degradation, and fracturing resulting in steel splinters is addressed by using an arcuate magnet. The arcuate magnet is made up of a series of magnets that are supported adjacent the outer periphery of the cylindrical blind trommel. The blind trommel is rotated. Steel balls and magnetic material are held to the inner periphery of the blind trommel and carried with it to the end of the arcuate magnet. The arcuate magnet may be made up of either electromagnets or permanent magnets. Another embodiment has one or more magnets attached to spaced positions around the outer periphery of the trommel. Permanent or electromagnets may be employed. Electromagnets are connected to slip rings that energize the magnets from about the 6 o'clock position and de-energize the magnets at about the 11 o'clock position. The permanent magnets are moved away from the blind trommel at about the 11:00 o'clock position. The magnetic material is released from the blind trommel at about the 11:00 o'clock position and collected in a tray inside the blind trommel. One magnet or a plurality of magnets can be used.

SUMMARY

The present disclosure describes a system that includes a rotating non-ferrous drum positioned on or in an external magnetic arc. Slurry containing solids is fed into the drum by a gravity infeed system. The system is easily maintained, relatively lightweight and non-restrictive in design. The gravity fed slurry infeed system includes an infeed hopper mounted on a hopper support structure, a variable speed drive system for rotation of the drum, a removable inlet pipe, an infeed baffle, spray seal, guide rollers, roller guides and magnetic arc actuators for the rotatable magnetic arc that has a decreasing magnetic field at an upper discharge end of the arc. The magnetic arc in one embodiment extends around both a lower half and an upper half so as to extend more than 180 degrees around the drum. In another embodiment the magnetic arc only extends around one half, for example the lower half so as to remove the need for the structure of the upper half, which may be a useful embodiment in the roughing or cobbing stage of iron ore magnetic separation in for example an iron ore beneficiation plant.

The magnetic arc is adjustable in its position relative to the drum so as to adjust the magnetite discharge point within the drum. The drum has a tiltable support structure to adjust the angle of the drum relative to horizontal for optimal slurry flow. A removable infeed deflector plate includes an inlet screen. The non-ferrous drum has an adjustable discharge weir, a discharge lip, and a removable magnetite hopper having a spray bar and nozzles. The magnetite hopper slides on rails. The hopper is non-ferrous and supported on a hopper and rail support structure.

In some applications a screen may be added to the discharge lip for capturing and retaining oversized non-ferrous material thereby reducing pump wear.

This system has other applications outside of the mineral processing industry and could be utilized for other separation applications, for example for the recovery or removal of tramp metal in the wood products industry or for the recovery or removal of tramp metal or other ferro-magnetic material in gravel in for example a trommel screen.

Applicant is not aware of apparatus and methods such as disclosed in the present specification to recover magnetite using an arcuate, static, array of magnets closely surrounding a rotating drum through which the slurry flows, where the array of magnets are permanent magnets arranged in decreasing strength from very strong magnets at the bottom of the array to release strength magnets at the opposite end of the array, and wherein the position of the array may be rotated relative to the drum, and where the magnet core includes permanent magnets arranged to have radially aligned magnetic fields, as better described below, in a ring arrangement surrounding the drum along the length of the magnetic arc. The applicant is also unaware of the use in the prior art of eddie producing slurry mixing ribs in the rotary drum, or the use of a back-flow generating spiral auger having spiral flutes deflect the slurry in a counter-flow direction to agitate the slurry back over the corresponding magnetic poles in the magnetic arc. These and the other techniques described herein provide for improved magnetic probing and combing of the slurry to improve the recovery of for example magnetite from the slurry while still allowing an optimized slurry flow rate for uninterrupted productivity.

DETAILED DESCRIPTION

Figure 1:
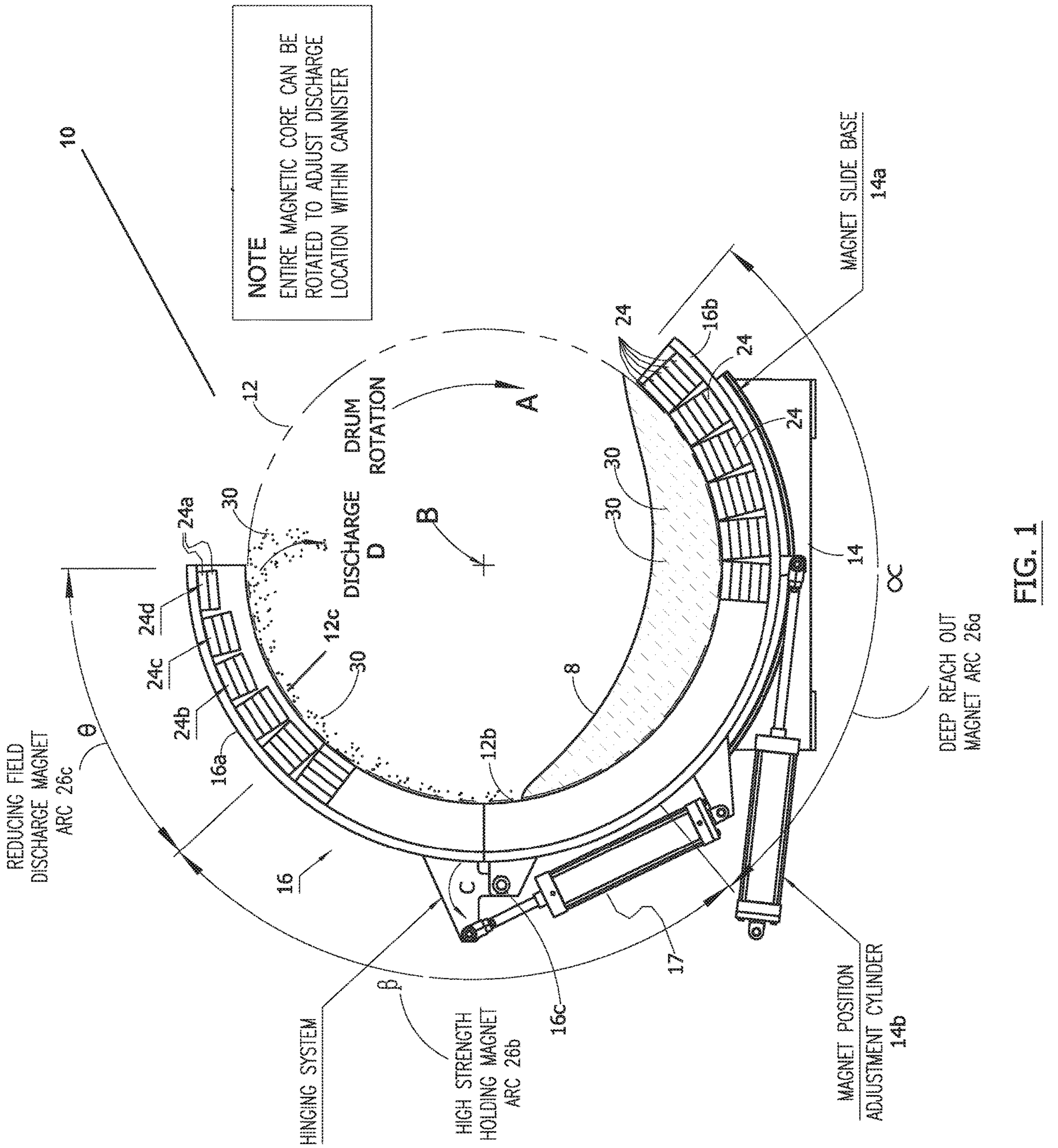
FIG. 1 is, in front section, partially cut away view the components of the magnet arc with the rotary drum shown in dotted outline.
Figure 13:
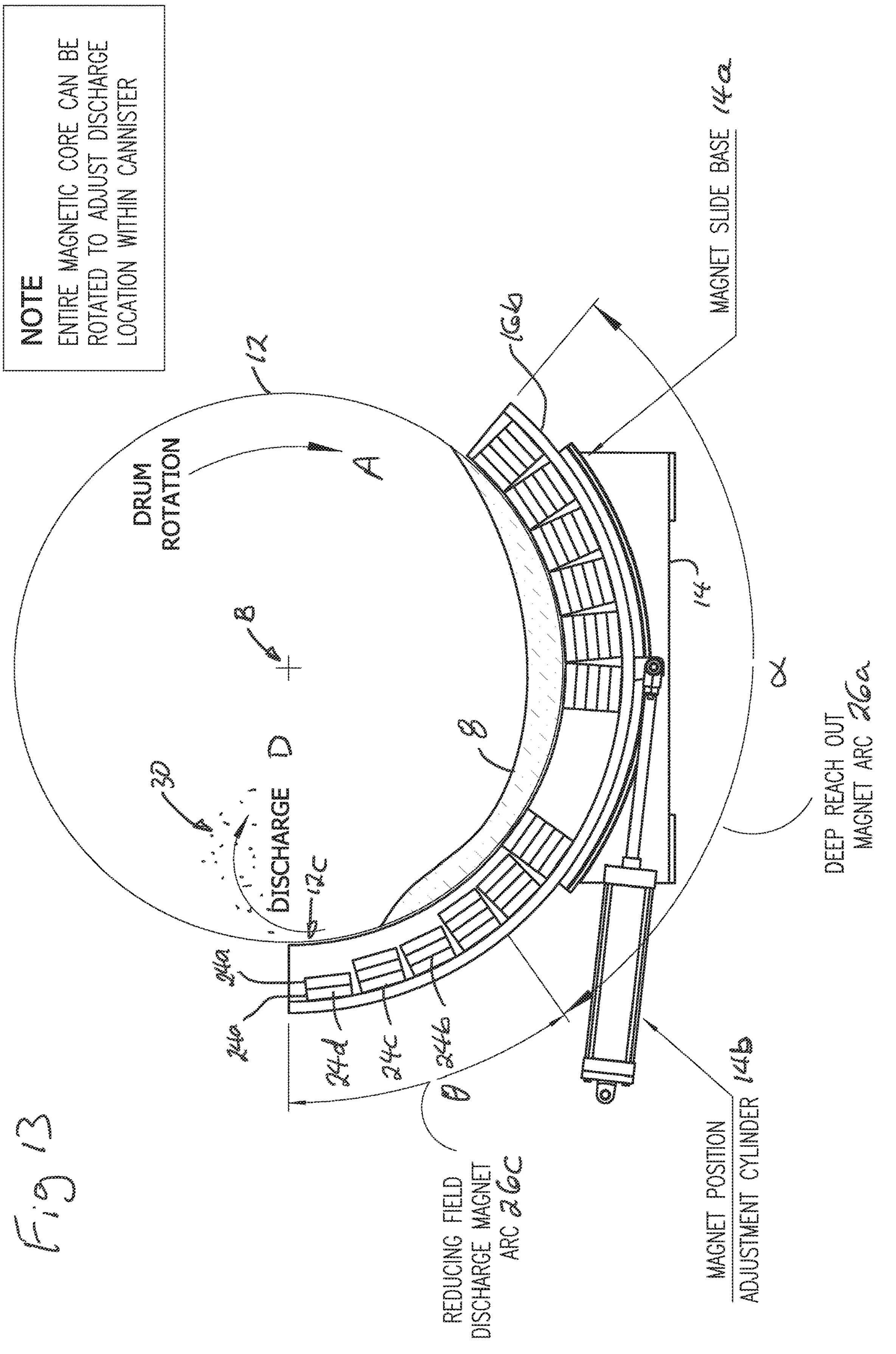
FIG. 13 is a further embodiment of the magnet arc illustrated in FIG. 1 using only the lower half of the magnetic arc.
Figure 14:
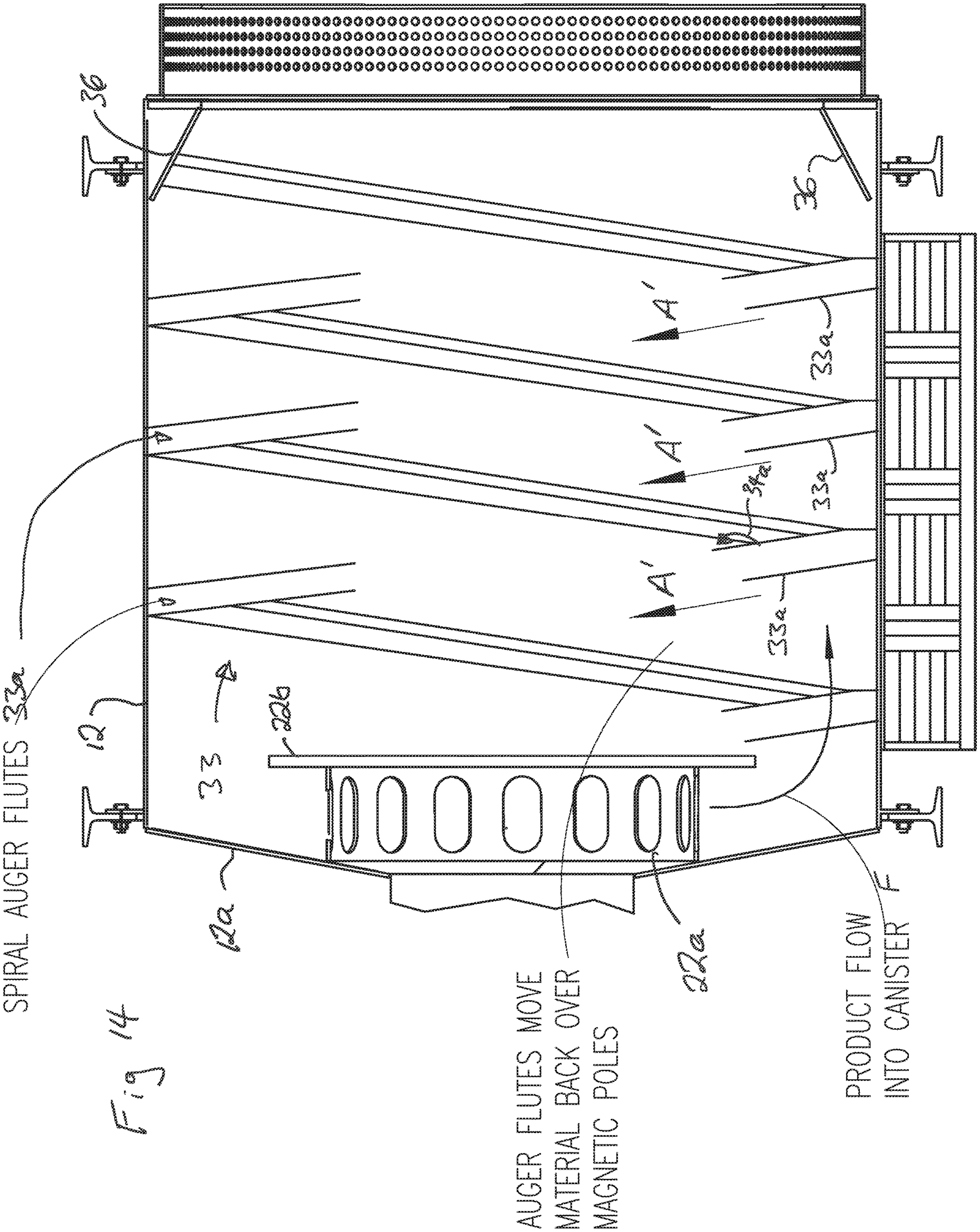
FIG. 14 is a further embodiment of the rotary drum of FIG. 2 showing a back-flow generating spiral auger within the drum.

A magnetite recovery system 10 includes, as seen in the accompanying Figures, a drum or canister 12 (herein referred to as a drum) rotatably mounted on base 14, and having a magnet housing 16 supported on roller guides **18*a*. The magnet arc is contained within housing 16. Housing 16 wraps partially around, so as to partially encase the drum. The drum is supported on rollers 18 by roller guides 18*a* mounted to the drum. The drum rotates on the base in direction A about axis of rotation B. Drum 12 is thus rotatably encased within magnet housing 16. In one preferred embodiment, as seen in FIG. 1, housing 16 has upper and lower halves 16*a*, 16*b* respectively. Upper half 16*a* opens upwardly and away from drum 12 about hinge 16*c*, in direction C, relative to lower half 16*b*, by the operation of actuators 17. In the embodiment of FIG. 14, only lower half 16*b* is used and consequently housing 16 only extends under the lower half 16*b*. The arrangement of magnets, as described below, is altered as compared to that of FIG. 1 so that the reducing field discharge magnet arc 26*c* is found adjacent the left-side upper end of the lower half 16*b* as seen in FIG. 13. The high strength holding magnet arc 26*b* is shortened or removed, leaving the deep reach magnet arc 26*a* under the lower half 16*b***.

The slurry 8 containing the magnetite 30 to be recovered flows from an infeed hopper 20 into, and through, a removable infeed pipe **20*a* in direction D. The slurry encounters an inlet baffle 22 at the downstream end of infeed pipe 20*a* and then enters into the upstream end 12*a* of drum 12 whereat the slurry flow is turned in direction E and dispersed radially through inlet screen 22*a* in directions F by deflector plate 22*b*. Upon radial dispersion of the slurry flow from inlet screen 22*a*, the slurry flow encounters the cylindrical wall of upstream end 12*a* of drum 12 and turns in direction F so as to flow downstream in direction H in what may be characterized as a partially helical or cork-screwing mixing path along the cylindrical wall 12*b* of drum 12** while the drum is rotating in direction A.

Figure 5:
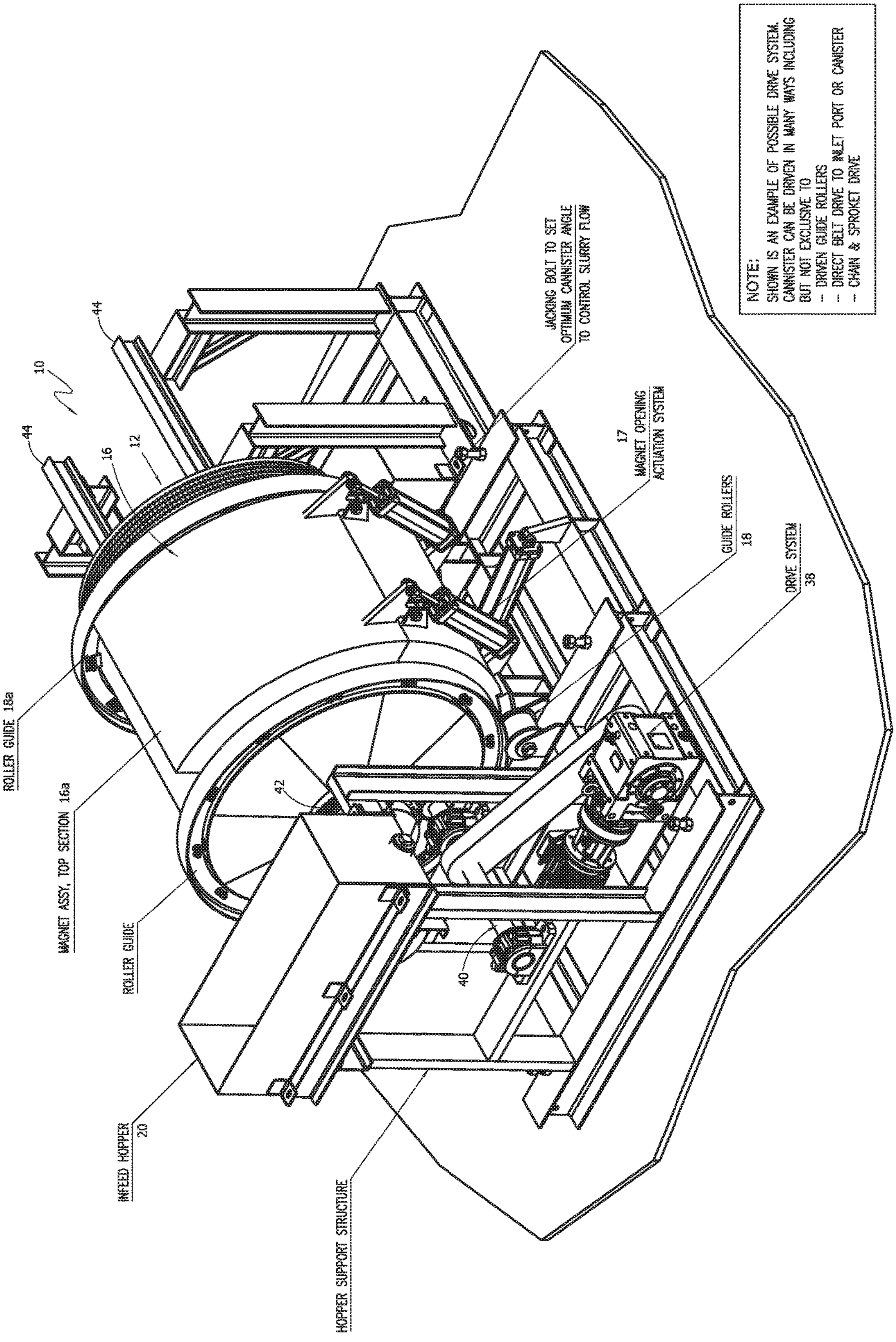
FIG. 5 is, in left rear isometric view the magnetite recovery system according to the present disclosure.
Figure 6:
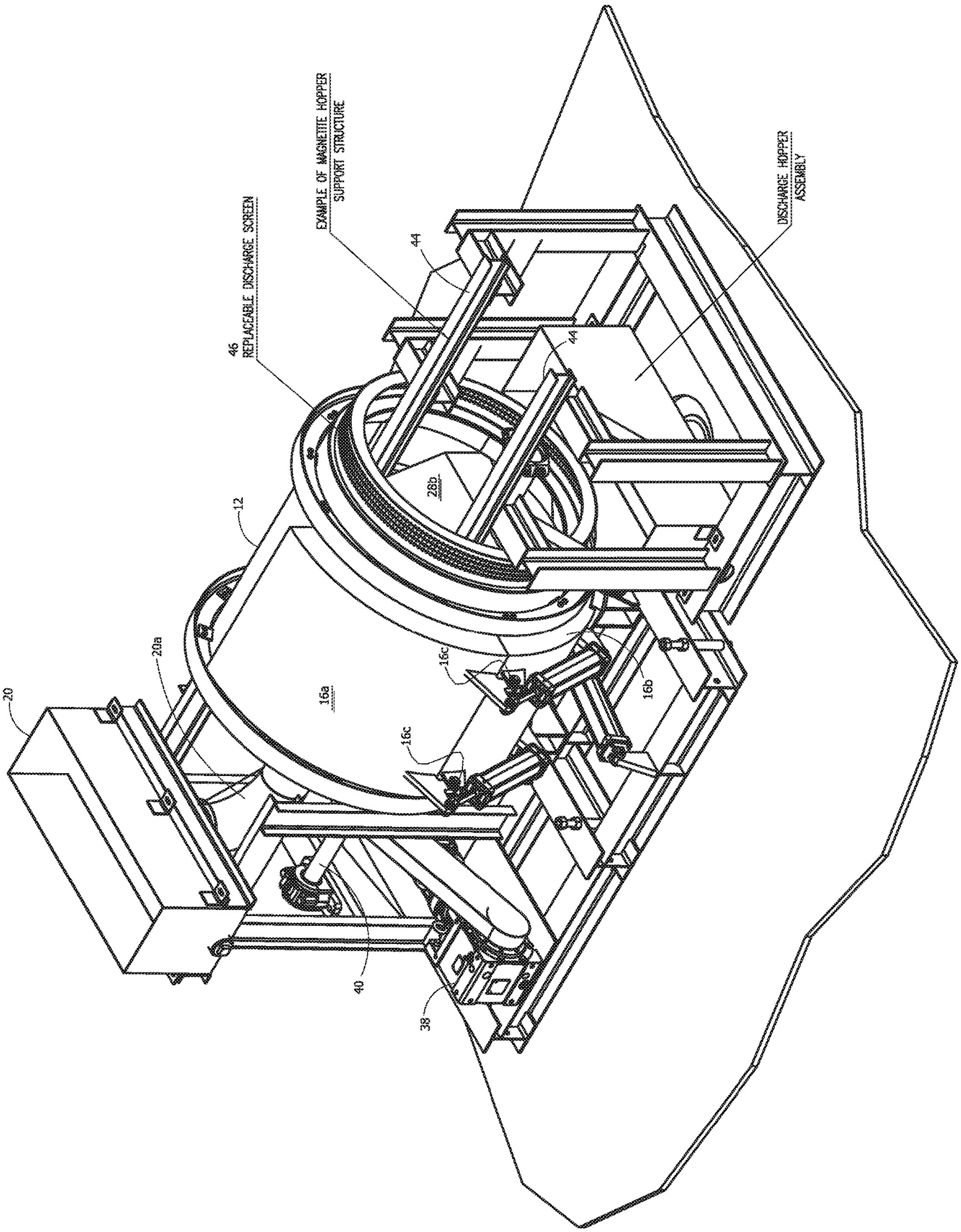
FIG. 6 is the magnetite recovery system of FIG. 5 in left front isometric view, showing the magnetite hopper inserted into the drum.
Figure 7:
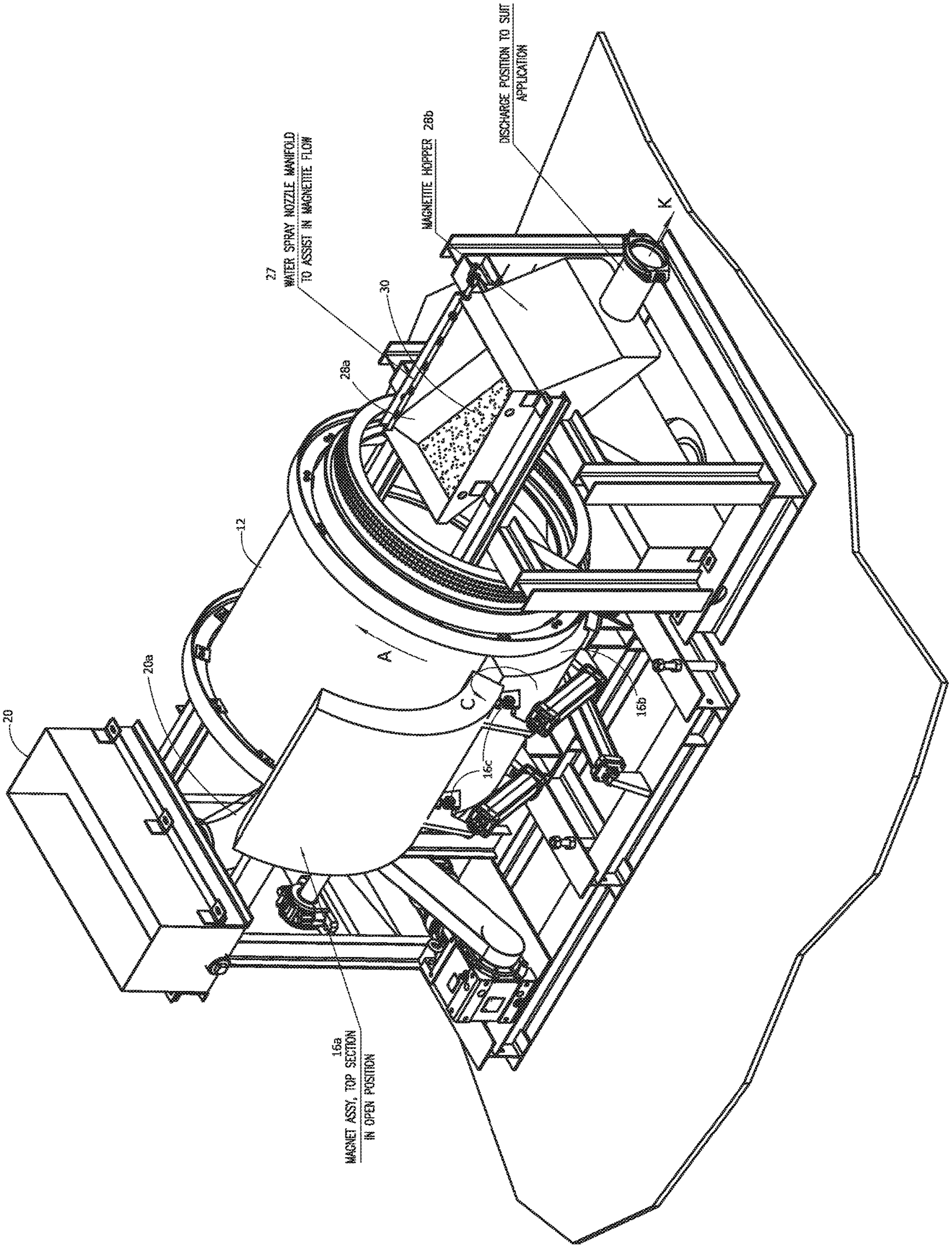
FIG. 7 is the view of FIG. 6 with the hopper retracted from the drum and showing the upper half of the magnet arc pivoted away from the drum.
Figure 8:
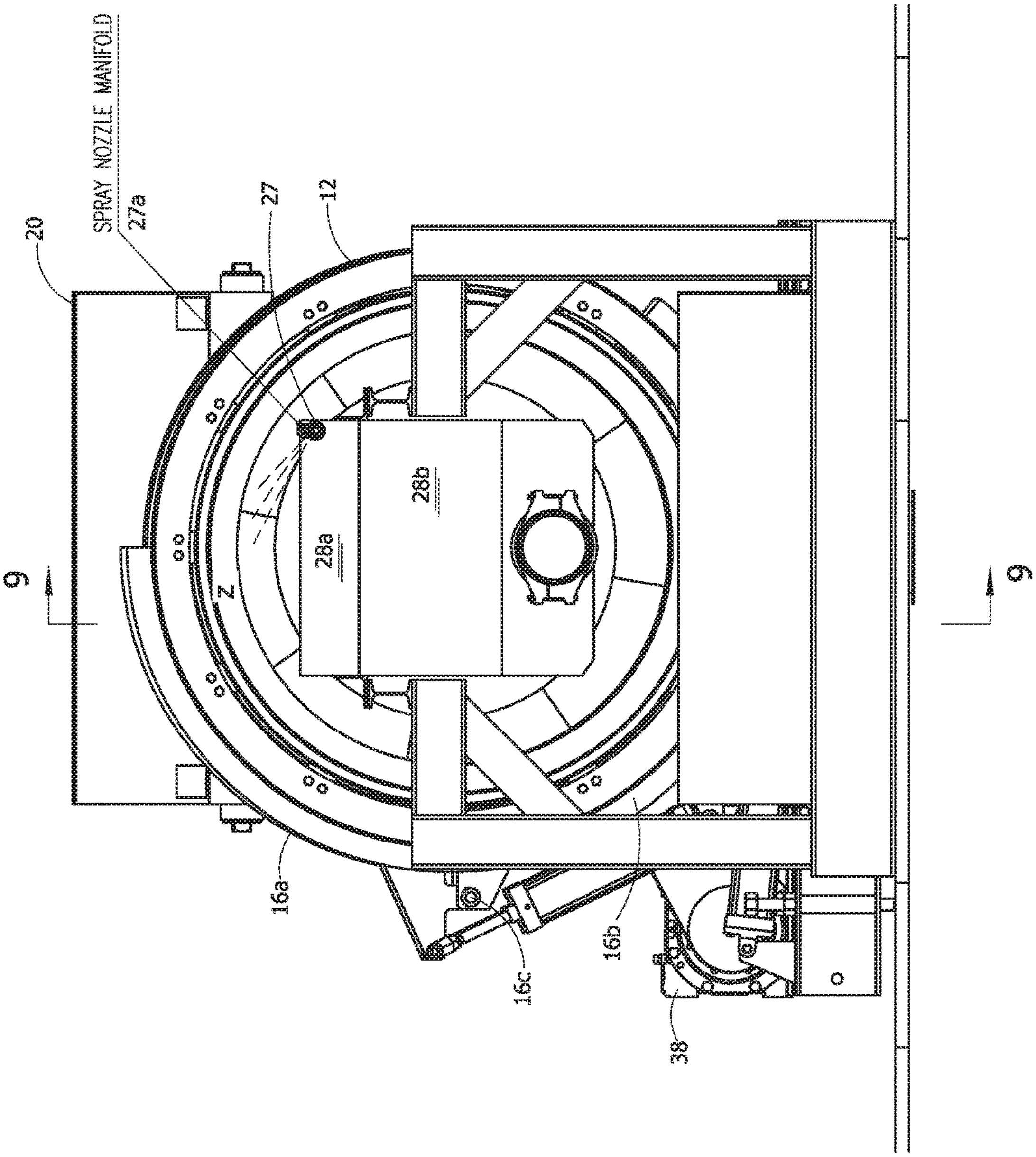
FIG. 8 is the front elevation view of the system of FIG. 6.

As seen in FIG. 5, jacking bolts are provided on the base frame to allow adjustment of the inclination angle of the drum 16 relative to horizontal. The greater the inclination angle, the greater the flow velocity in direction H of slurry 8. The inclination angle of the drum may thus be optimized for extraction of the magnetite by decreasing the inclination angle to increase the time that it takes for slurry to flow through the drum. The greater the dwell time of the slurry in the drum, the greater the percentage of magnetite extraction. The optimized inclination angle thus optimizes the percentage of magnetite extracted versus moving the slurry through the drum quickly.

Figure 2:
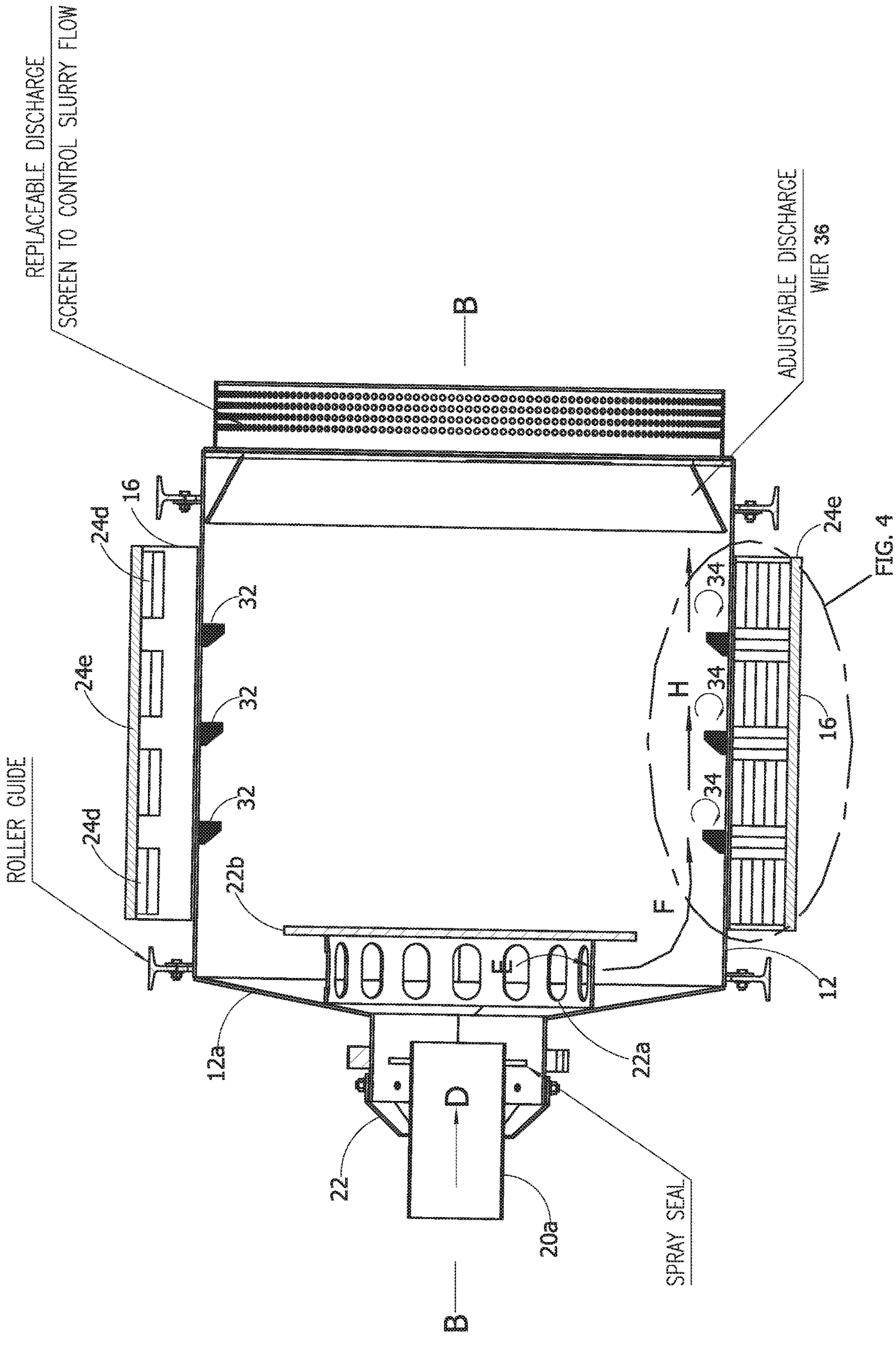
FIG. 2 is a partially cut away left side elevation view of one embodiment of the rotary drum.
Figure 3:
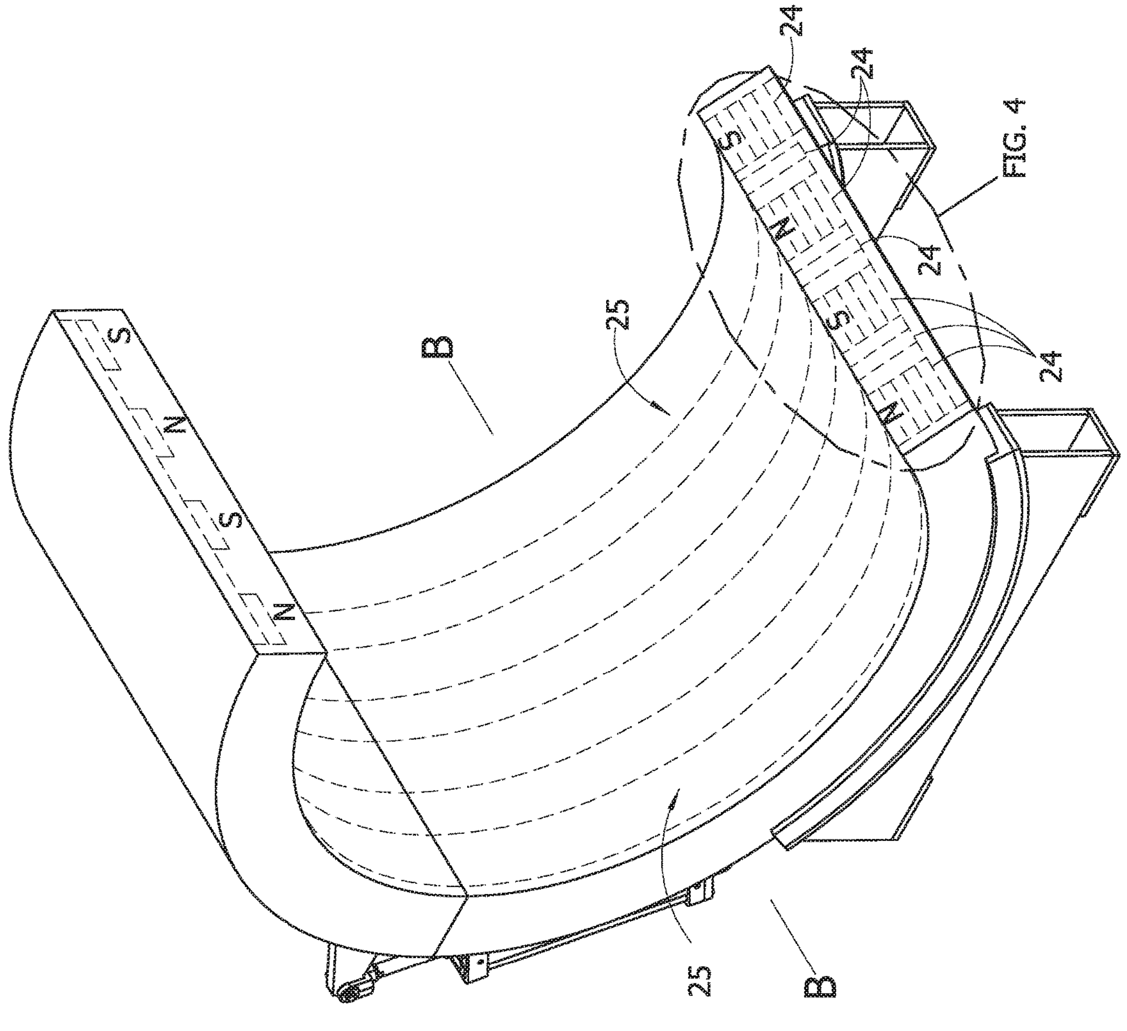
FIG. 3 is, in perspective view, the magnet arc of FIG. 1.
Figure 4:
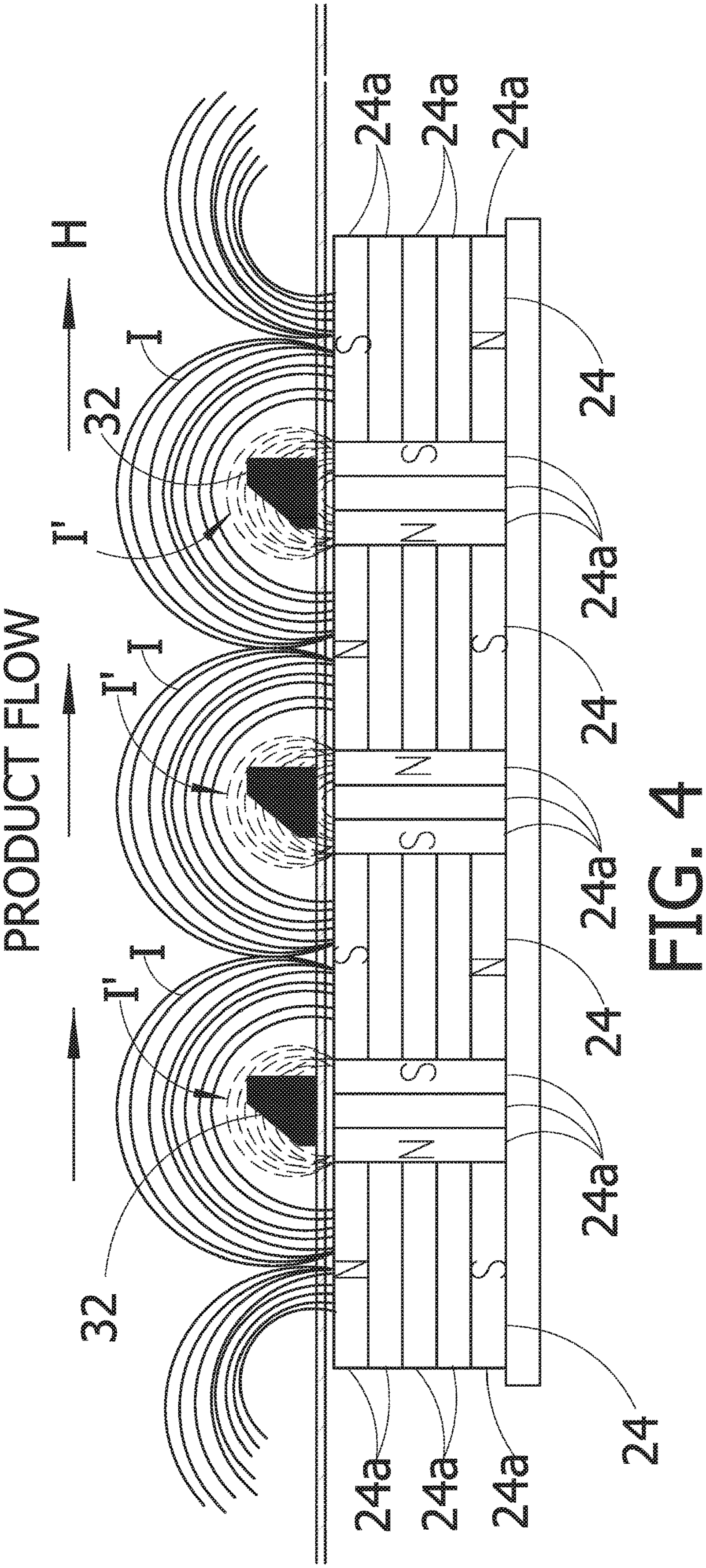
FIG. 4 is, an enlarged portion of FIG. 3 showing the magnet circuit in elevation view.

Permanent magnets 24 are mounted in magnet housing 16 so that the radial alignment of their magnetic fields I are as shown in FIG. 4. The magnetic fields attract magnetite 30 in the flow of slurry 8 towards the interior surface of cylindrical wall **12*b* of drum 12. Each of permanent magnets 24 may be an assembly of stacked magnetic plates 24*a*, as also seen in FIGS. 2 and 3 (FIG. 4 being an enlarged view of a portion of FIGS. 2 and 3), with an alternative embodiment seen in FIG. 13. The greater the number of magnetic plates 24*a* in the stack, the greater the strength of the magnetic field for that stack, and the stronger and deeper reaching the magnetic attractive force acting on the magnetite 30 in the slurry 8. Thus, as seen in FIG. 3, an array of the curved rings of magnets 24 arrayed internally in housing 16 extend partially around drum 12, so that each ring 25** in the array of adjacent rings curve around the axis of drum rotation B.

As seen in FIG. 1, the lower 90° quadrant of housing 16 may be characterized as deep reach-out magnet arc **26*a*. The adjacent quadrant may be characterized as the high strength holding magnet arc 26*b*. The remaining adjacent uppermost portion, for example having a 45° arc, may be characterized as the reducing field discharge magnet arc 26*c*. Magnet arc 26*a* contain the greatest number of plates 24*a* in each stack and thus have the strongest magnetic field. Magnet arc 26*a* extends its arc around the array of rings 25 by, approximately a 90 degree sweep (angle α) about axis B, wherein axis B is both the axis of rotation of drum 12 and the axis of symmetry of housing 16 about which housing 16 extends cylindrically. Magnet arc 26*a* is positioned in the bottom or lowermost quadrant of housing 16 so as to be positioned under where the flow of slurry 8 will gravitate under the force of gravity upon entering drum 12. Magnets 24 in arc 26***a* act to pull magnetite 30 radially outwardly from the full depth (measured radially of axis B) of the slurry flow so as to thus migrate to wall 12*b* or at least to migrate sufficiently radially outwardly so as to be within the reduced strength and depth of magnetic influence of the magnetic field of magnets 24 in arc 26*b*.

Magnets 24 in arc 26*b* extend contiguously from magnets 24 in arc 26*a* in their corresponding ring 25 in the direction A of rotation of drum 12. Magnets 24 in arc 26*b* act to pull the magnetite 30 remaining in the slurry flow against the interior surface of drum wall 12*b* so that the magnetite adheres to the drum wall 12*b* and thus is carried on the wall interior surface as the drum continues to rotate in direction A. The captured magnetite 30 is carried on the drum wall 12*b* as the drum 12 continues to rotate so that the magnetite moves from the influence of, firstly, the magnets in arc 26*a*, then from the influence of, secondly, the magnets in arc 26*b* so as to finally come within the yet again and further reduced magnetic strength of the magnets in arc 26*c*. Within the arc 26*c*, the magnetic fields of magnets 24 are sequentially reduced so as to further weaken the magnetic hold on the adhered magnetite 30 as the drum rotates in direction A to take the adhered magnetite to for example the 12 o'clock position.

Figure 9:
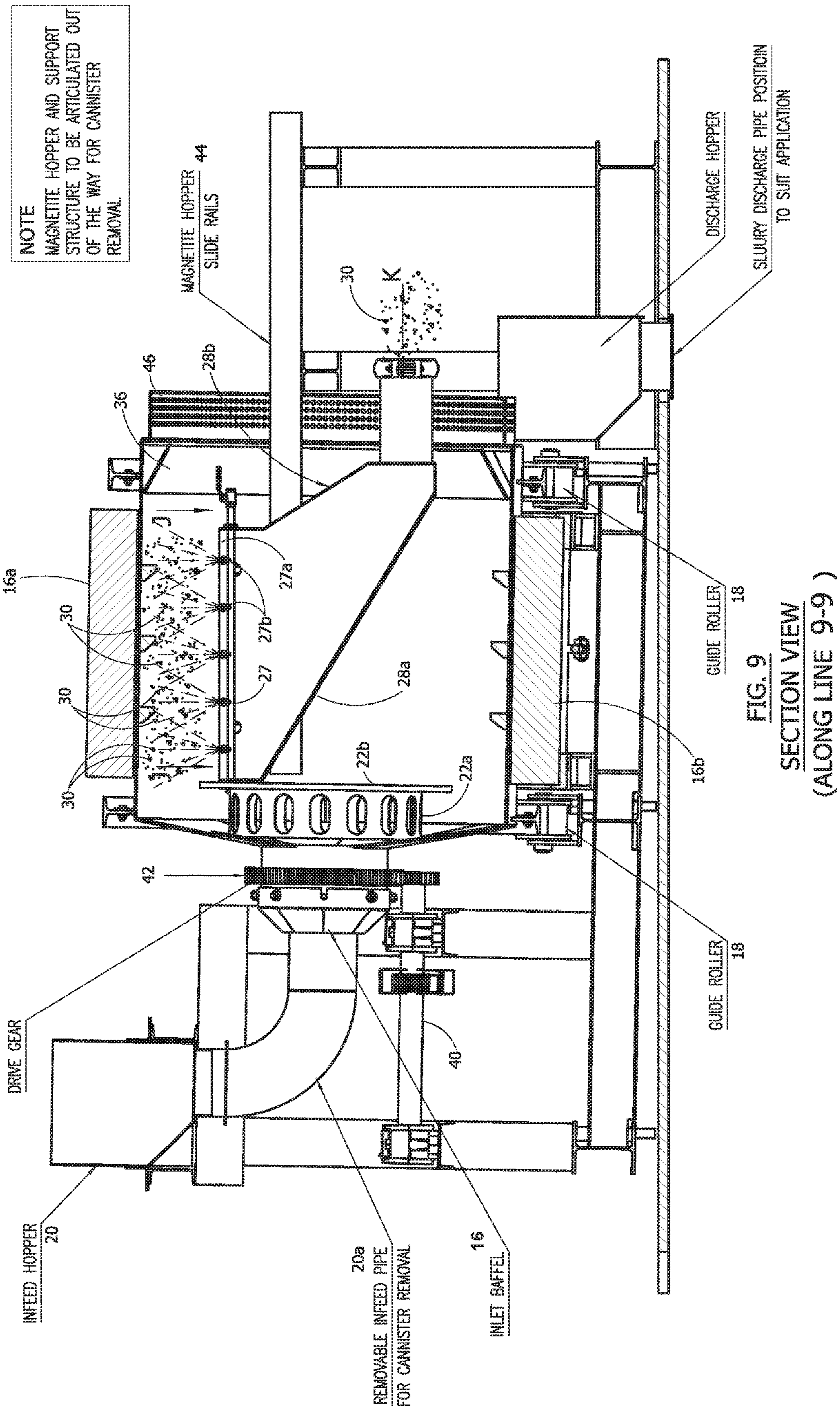
FIG. 9 is a cross sectional view along line 9-9 in FIG. 8.
Figure 10:
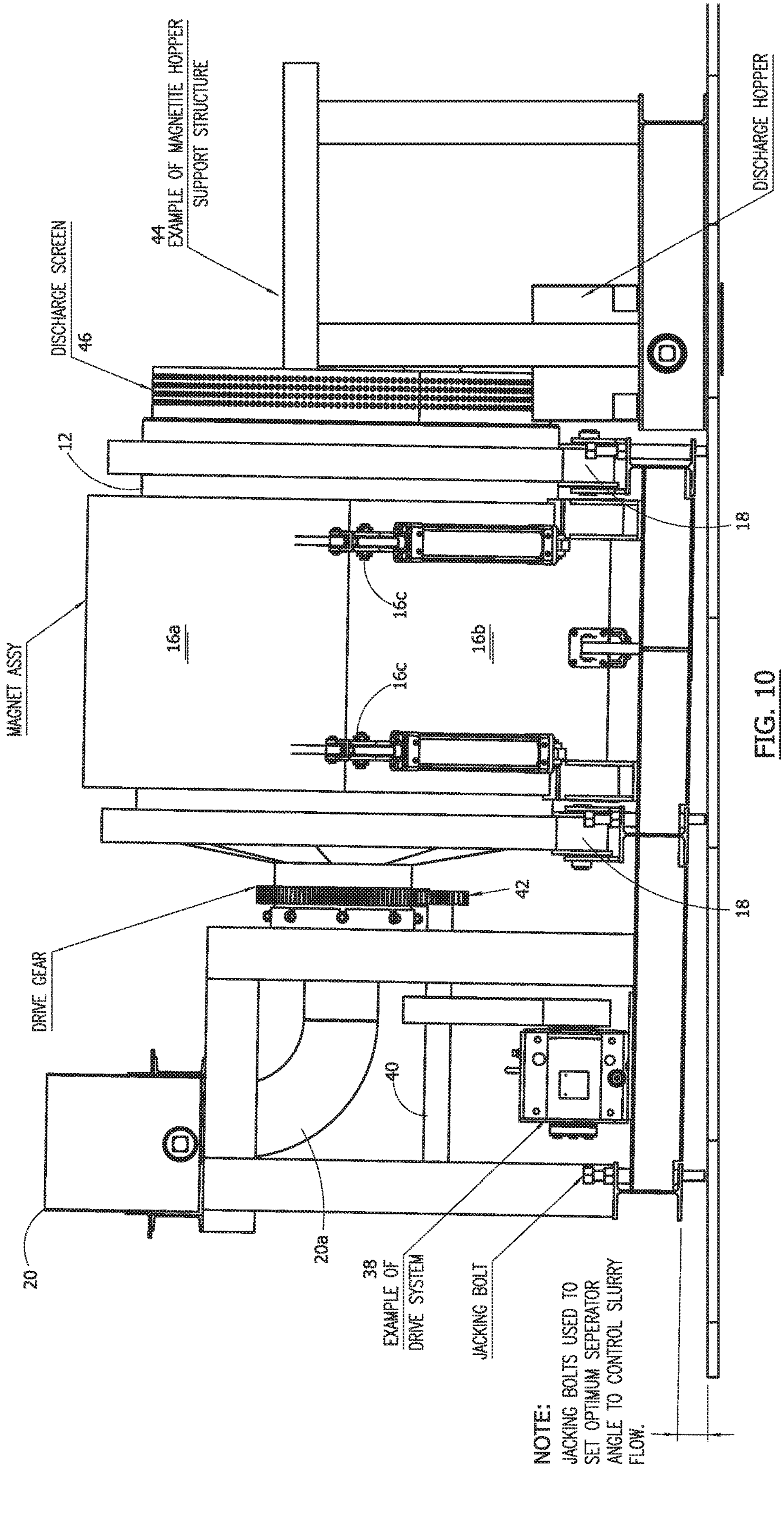
FIG. 10 is a left hand side elevation view of the system of FIG. 5.
Figure 11:
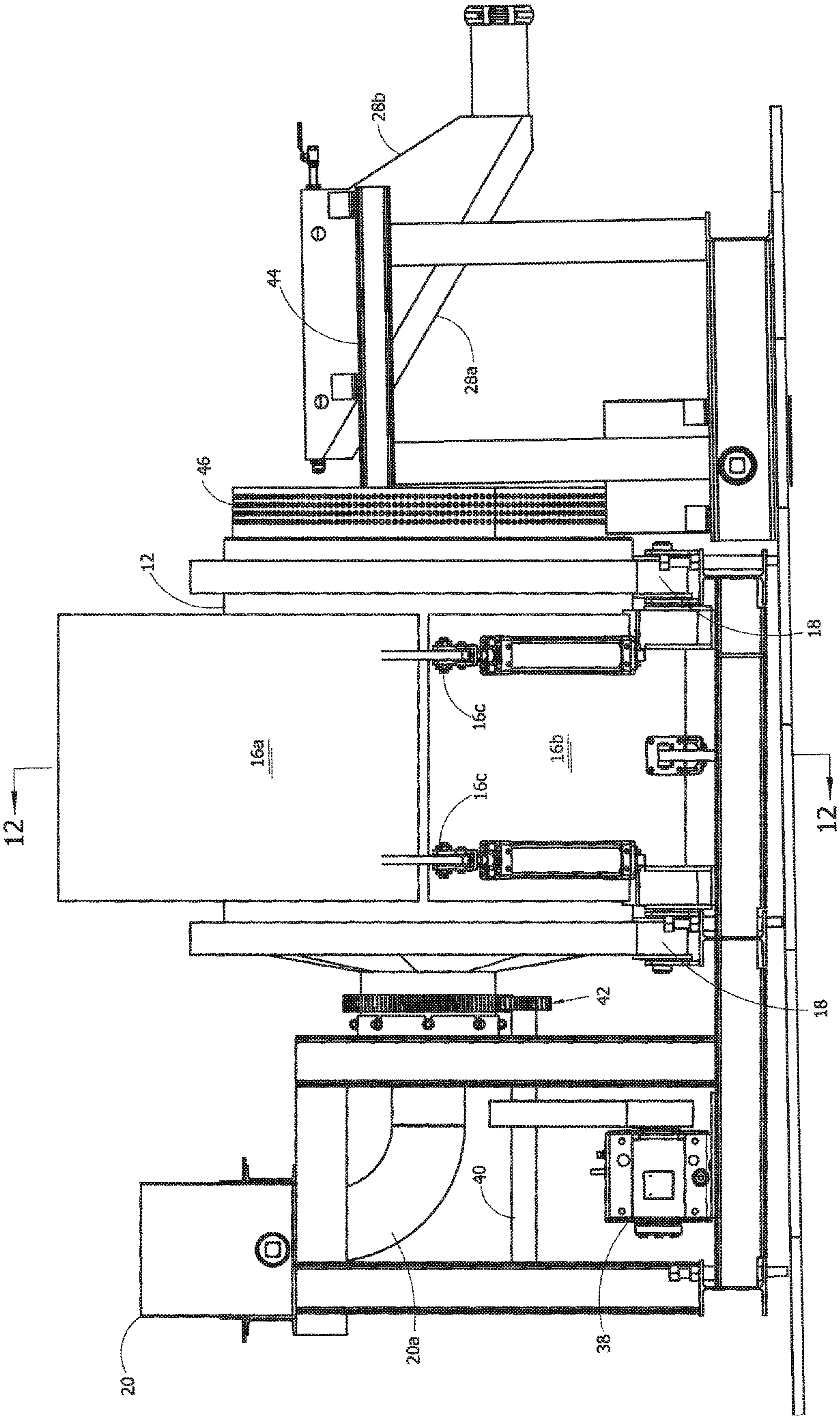
FIG. 11 is a left hand side elevation view of the system as illustrated in FIG. 7.
Figure 12:
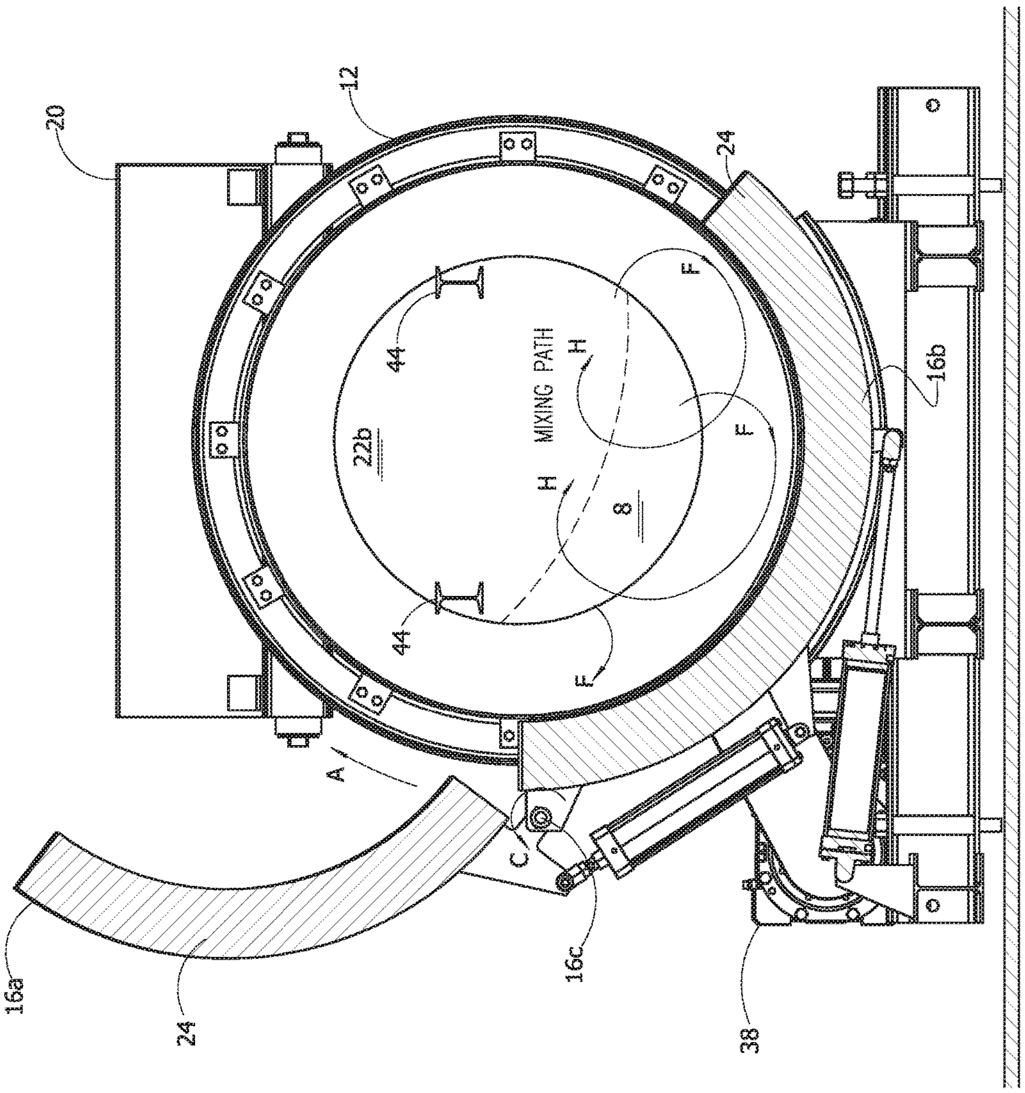
FIG. 12 is a cross sectional view along line 12-12 in FIG. 11.

By way of example, as seen in FIG. 1, the magnets 24 in arc 26*c* may include three reduced-strength magnets 24*b*, 24*c*, 24*d* which are sequentially reduced in size, and hence reduced in strength sequentially (from left to right in FIG. 1) within the Reducing Field Discharge Magnet Arc 26*c*. Thus as drum 12 rotates in direction A, magnetite 30, for example in the form of particles, which have been adhered magnetically to the interior wall of the drum by firstly passing through the magnetic fields of the magnet 26*a*, and next through the magnetic fields of the magnet arc 26*b*, is carried on the drum wall through the reducing-in-strength array of magnetic fields of the magnet arc 26*c*. The result is that the magnetite 30 is only weakly adhered to the drum wall as the magnetite is carried across arc 26*c* in direction A. As the magnetite 30 is leaving the reduced magnetic adherence in arc 26*c*, it is free to fall under the force of gravity. A spray of water from sprayer 27 assists in removal of the magnetite from the drum wall. An upwardly opening recovery funnel or chute 28*a* is retractably mounted with drum 12 and positioned to capture falling magnetite 30 falling in direction J (seen in FIG. 9) from the interior wall of drum 12 as it passes the last of magnets 24*d* at the top of the arc 26*c*. Recovery chute 28*a* directs recovered magnetite 30 for removal from drum 12 in direction K into magnetite hopper 28*b*.

In one preferred embodiment such as seen in FIG. 2, annular ribs 32 are mounted on the interior drum wall, spaced apart in the direction of flow H. Ribs 32 are shown, in cross-section, in FIGS. 2 and 4. Ribs 32 are annular about axis B, and lie in planes orthogonal to axis B. Ribs 32 are intended to cause flow eddies 34 immediately behind (downstream) of ribs 32. Flow eddies 34 increase the mixing of the slurry flow, enhancing the ability of the magnets to pull magnetite 30 from the slurry flow. Annular lip 36, which may be an adjustable discharge weir as shown, may be provided at the downstream end of drum 12 to assist in holding the slurry flow in the drum. In another embodiment as seen in FIG. 14, instead of ribs 32, a back-flow generating spiral auger 33 is mounted around the inner wall of the rotary drum. The spiral flutes 33*a* of auger 33 rotate in direction A' as drum 12 rotates in direction A so as to deflect the slurry in a counter-flow direction 34*a* (illustrated by way of example not intended to necessarily reflect actual complex flow directions) to agitate or urge the slurry back over the corresponding magnetic poles in the magnetic arc thereby increasing the effectiveness of the magnetic fields in attracting the magnetite.

The magnetic plates 24*a* may be mounted to a backing plate 24*e*. The resulting structure forms the magnetic core.

In one embodiment the angular position about axis B of magnet housing 16 is adjustable relative to drum 12 so as to adjust the magnetite discharge location 12*c* of discharge D within drum 12, for example to the 11 o'clock position or to the 1 o'clock position depending on the magnetic adherence of the magnetite or para-magnetics in the example of FIG. 1, or the 9 o'clock position in the example of FIG. 13. The angular position of housing 16 may be adjustable, for example, by being mounted on a slide base 14*a* and movable by an actuator 14*b*.

The drive system for rotating drum 12 may be conventional. For example, a drive motor 38 may rotate a drive shaft 40 which, in turn, rotates drum 12 by means of reduction gearing 42.

Advantageously, magnetite recovery chute 28*a* and hopper 28*b* are slidably mounted on horizontal slide rails 44 for retraction of the recovery chute 28*a* and hopper 28*b* from inside drum 12. Recovery chute 28*a* is aligned under the Reducing Field Discharge Magnet Arc 26*c* when fully slid inside drum 12 on rails 44.

Sprayer 27 includes manifold 27*a* and corresponding spray nozzles 27*b* mounted on manifold 27*a*, Manifold 27*a* is mounted on or alongside recovery chute 28*a*, positioned so that the spray from nozzles 27*b* is directed against the drum wall 12*b* in zone Z; under the reducing field discharge magnets, or at least under the weakest magnetic field in that zone.

A replaceable annular discharge screen 46 may be mounted around the downstream end 12*c* of drum 12, downstream of lip or weir 36.

As seen in FIGS. 3 and 4, in the preferred embodiment, within each ring 25 two horizontally stacked stacks of magnet plates 24*a* sandwich a vertically stacked stack of magnet plates 24*a*. The first, shown as the left-hand magnet 24, of the horizontal stack of plates 24*a* has its north pole radially inward towards axis B, and the second of the horizontal stack of plates 24*a* shown as the right-hand magnet 24, has its south pole radially inward towards axis B. The vertically stacked plates, which are aligned under ribs 32 and sandwiched between the first and second horizontal stacks of plates, have their north and south pole at right angles to the poles of the horizontally stacked plates. The resulting magnetic fields I', as depicted diagrammatically in FIG. 4, give a "bump" to the magnetic fields I, assisting further penetration of magnetic fields I into slurry 8 and magnetic field penetration into the mixing behind ribs 32 or adjacent auger flutes 33*a*. This arrangement of the magnet core in the magnet arcs that produce the radial magnetic fields is an opposite arrangement to that found in the prior art such as seen in U.S. Pat. No. 5,975,310 to Darling et al. discussed above.

The invention claimed is:

1. An apparatus for removal of ferro-magnetic material comprising:

a base;

a hollow drum rotatably supported on the base around a periphery of the drum, the drum being rotatable along an axis and extending between an upstream and a downstream end;

a slurry inlet at the upstream end of the drum for introduction of a slurry containing ferromagnetic material thereinto;

and a magnet housing supported by the base and surrounding the hollow drum, the magnetic housing comprising:

a lower portion extending under and around at least a lower surface of the drum;

an upper portion extending over an upper surface of the drum and being hingedly connected to the lower portion of the magnet housing through a hinge;

at least one actuator operatively coupled to the upper portion of the magnet housing; and an array of magnets mounted around the housing and arranged so that magnetic fields corresponding to the array of magnets act to magnetically attract the ferromagnetic material from the slurry as the drum rotates; and a recovery vessel freely selectably slidable into the downstream end of the drum to a position operable to capture the Ferro-magnetic material falling from the interior wall of the drum, wherein the array of magnets extend from at least around the lower portion of the magnet housing, wherein the upper portion of the magnet housing is rotatable relative to the lower portion of the magnet housing by the at least one actuator to form an opening through which the drum is removable from therethrough once the recovery vessel is removed therefrom.

2. The system of claim 1 wherein the magnetic field comprises a deep-reach strength magnetic field adjacent the lower portion and a release strength magnetic field adjacent the upper portion, and wherein the strength of the magnetic fields sequentially decreases in the direction of rotation of the drum, around the magnet housing from the deep reach strength to the release strength.

3. The system of claim 2 wherein the deep reach strength magnetic field occupies substantially a lower-most quadrant of the drum.

4. The system of claim 3 wherein a holding strength magnetic field, lower in strength than the deep reach magnetic field and higher in strength than the release strength magnetic field, is positioned substantially contiguously between the deep reach magnetic field and the release strength magnetic field.

5. The system of claim 4 wherein the holding strength magnetic field occupies a second, intermediate quadrant continuous to and above the deep reach magnetic field quadrant.

6. The system of claim 5 wherein the release strength magnetic field occupies an upper zone above the second, intermediate quadrant.

7. The system of claim 6 wherein the upper zone terminates at substantially an upper-most portion of the drum.

8. The system of claim 1 wherein the array of magnets forms, a magnetic core having radially aligned magnetic fields.

9. The system of claim 1 wherein the magnetic housing is selectively movable relative to the drum so as to selectively adjust the position of the release strength magnetic field relative to the drum to alter a discharge location of the ferro-magnetic material.

10. The system of claim 1 wherein the recovery vessel is selectively removable from the drum along the axis of rotation of the drum.

11. The system of claim 10 wherein the recovery vessel is slidably mounted on rails extending into the drum.

12. The system of claim 1 wherein at least one slurry flow deflector is mounted on the interior wall of the drum.

13. The system of claim 12 wherein the at least one flow deflector is at least one annular rib mounted around the interior wall of the drum so as to intercept a flow of the slurry when in the drum.

14. The system of claim 12 wherein the at least one annular rib Has substantially in a plane orthogonal to the axis of rotation of the drum.

15. The system of claim 14 wherein the at least one annular rib is a spaced array of annular ribs spaced along the interior wall of the drum.

16. The system of claim 12 wherein the at least one flow deflector is a spiral auger arranged to cause, adjacent the auger, a back flow of the flow of slurry through the drum as the drum rotates.

17. The system of claim 1 wherein the downstream end of the drum is open and wherein an annular weir is mounted in the downstream open end of the drum.

18. The system of claim 5 wherein the magnet housing conforms in shape to the exterior shape of the drum.

19. The system of claim 3 wherein the drum is cylindrical and the magnet housing is correspondingly curved.

20. The system of claim 1 wherein a sprayer cooperates with the recovery vessel and the drum to flush the ferromagnetic material from a drum wall at an upper-most portion of the drum into the recovery vessel.

* * * * *